United States Patent
Sandstrom et al.

(10) Patent No.: US 10,721,393 B2
(45) Date of Patent: Jul. 21, 2020

(54) LASER RANGING AND ILLUMINATION

(71) Applicant: Axis AB, Lund (SE)

(72) Inventors: Oscar Sandstrom, Malmo (SE); Can Xu, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 15/858,008

(22) Filed: Dec. 29, 2017

(65) Prior Publication Data

US 2019/0208113 A1    Jul. 4, 2019

(51) Int. Cl.
| | |
|---|---|
| H04N 5/232 | (2006.01) |
| H04N 5/225 | (2006.01) |
| G01S 17/36 | (2006.01) |
| G01S 17/87 | (2020.01) |
| G01S 7/48 | (2006.01) |
| G01S 7/4915 | (2020.01) |
| G01S 17/42 | (2006.01) |
| G01S 7/4911 | (2020.01) |
| G01S 17/86 | (2020.01) |

(52) U.S. Cl.
CPC ....... H04N 5/23219 (2013.01); G01S 7/4808 (2013.01); G01S 7/4911 (2013.01); G01S 7/4915 (2013.01); G01S 17/36 (2013.01); G01S 17/42 (2013.01); G01S 17/86 (2020.01); G01S 17/87 (2013.01); H04N 5/2256 (2013.01); H04N 5/23212 (2013.01)

(58) Field of Classification Search
None
See application file for complete search history.

(56) References Cited

U.S. PATENT DOCUMENTS

| | | | |
|---|---|---|---|
| 8,111,383 B1 | 2/2012 | Foley | |
| 2005/0046823 A1* | 3/2005 | Ando | G01S 7/4811 356/4.01 |
| 2007/0001822 A1 | 1/2007 | Haug | |
| 2007/0071433 A1 | 3/2007 | Kawanami | |
| 2007/0182528 A1* | 8/2007 | Breed | B60Q 9/008 340/435 |
| 2010/0038520 A1 | 2/2010 | Yenisch et al. | |
| 2014/0160254 A1 | 6/2014 | Pelman et al. | |

(Continued)

FOREIGN PATENT DOCUMENTS

AU    2013248208 A1    5/2014

OTHER PUBLICATIONS

Extended European Search Report issued in corresponding EP Application No. 18156609.2, dated Aug. 17, 2018, 8 pages.

(Continued)

*Primary Examiner* — Mark T Monk
(74) *Attorney, Agent, or Firm* — Snyder, Clark, Lesch & Chung, LLP (57) ABSTRACT

A method may include modulating a property of a laser with a reference signal to generate a transmit signal, and diverging the transmit signal to illuminate a field of illumination with the transmit signal, wherein the field of illumination includes an object. The method may include receiving, at a sensor, a signal reflected from the field of illumination and the object and comparing a phase of the received signal to a phase the reference signal. The method may include calculating a distance to the object based on the comparing.

20 Claims, 9 Drawing Sheets

(56) References Cited

U.S. PATENT DOCUMENTS

2017/0035299 A9* 2/2017 Goldman .............. A61B 5/489

OTHER PUBLICATIONS

Geske, Jon, et al., "High power VCSELs for minature optical sensors," Vertical-Cavity Surface-Emitting Lasers XIV, edited by James K. Guenter et al., Proc. of SPIE vol. 7615, 2010, 11 pages, downloaded from <http://proc.eedings.spiedigitallihrary.org/> on May 25, 2015.

Andersson, Martin, et al., "Design of Lidar-system," Master's Thesis, Department of Electrical and Information Technology, Lund University, 126 pages, Jun. 26, 2014.

* cited by examiner

LASER RANGING AND ILLUMINATION

BACKGROUND

As cameras and other monitoring devices become less expensive, these devices are proliferating. At times, however, darkness can obscure or shroud an object in the field of view of a camera. As a result, an operator of the camera (or computer vision) may not be able to discern the object. Thus, the process of capturing an image of the object may involve illuminating a scene as well as focusing on the object. The source of illumination may be natural or unnatural, and attached to or detached from the camera. Focusing may be performed automatically by the camera or manually by the photographer. When focusing is performed automatically, the camera may detect the distance to the object on which to focus.

SUMMARY

A method may include modulating a property of a laser with a reference signal to generate a transmit signal, and diverging the transmit signal to illuminate a field of illumination with the transmit signal, wherein the field of illumination includes an object. The method may include receiving, at a sensor, a signal reflected from the field of illumination and the object and comparing a phase of the received signal to a phase the reference signal. The method may include calculating a distance to the object based on the comparing.

Comparing the phase may include measuring a phase difference between the received signal and the reference signal, and calculating the distance to the object based on the phase difference. The method may include lowering an average intensity of the transmit signal when the calculated distance is below a threshold. Modulating the property of the laser may include modulating an intensity of the laser.

Receiving at the sensor may include capturing, in a camera, an image including a field of view illuminated by the transmit signal and detecting boundaries of the object in the image. The method may include discerning portions of the received signal associated with the object based on the detected boundaries. Measuring the phase difference may include measuring a phase difference between the portions of the received signal associated with the object and the reference signal. Calculating the distance may include calculating the distance to the object based on the phase difference between the portions of the received signal associated with the object and the reference signal.

The method may include determining that the object is a human and lowering an intensity of the laser when the calculated distance is below a first threshold and when determined that the object is the human. Detecting boundaries of the object may include detecting boundaries of a face of the human. Receiving at the sensor may include capturing, in a camera, an image of the field of view, including the object, illuminated by the transmit signal, wherein the calculated distance is used as a reference point for an autofocus algorithm.

The autofocus algorithm may be contrast based and the calculated distance may be used to set a lower and upper bound for the algorithm. A difference between the lower and upper bound is based on a signal strength of the received signal such that a low signal strength results in a larger difference than a high signal strength.

A device may include a laser, a driver, a lens, a sensor, a mixer and a processor. The driver may modulate a property of the laser with a reference signal to generate a transmit signal. The lens may diverge the transmit signal to illuminate a field of illumination with the transmit signal, wherein the field of illumination includes an object. A sensor may receive a signal reflected from the field of illumination and the object. A mixer may compare a phase of the received signal to a phase the reference signal. A processor may to calculate a distance to the object based on the comparison.

The mixer may measures a phase difference between the received signal and the reference signal, and the processor may calculates the distance to the object based on the phase difference. The driver may lower an average intensity of the transmit signal when the calculated distance is below a threshold. The driver may modulate an intensity of the laser.

The device of may include a camera to capture an image including a field of view illuminated by the transmit signal. The processor may be configured to detect boundaries of the object in the image and discerning portions of the received signal associated with the object based on the detected boundaries. The mixer may be configured to measure a phase difference between the portions of the received signal associated with the object and the reference signal. The processor may be configured to calculate the distance to the object based on the phase difference between the portions of the received signal associated with the object and the reference signal.

The processor may be configured to determine that the object is a human. The driver lowers an intensity of the laser when the calculated distance is below a first threshold and when the processor determines that the object is the human. The processor may be configured to detect boundaries of a face of the human.

The camera may be configured to capture an image of the field of view, including the object, illuminated by the transmit signal, wherein the calculated distance is used as a reference point for an autofocus algorithm. The autofocus algorithm may be contrast based and the calculated distance is used to set a lower and upper bound for the algorithm. A difference between the lower and upper bound is based on a signal strength of the received signal such that a low signal strength results in a larger difference than a high signal strength.

DESCRIPTION

The following detailed description refers to the accompanying drawings. The same reference numbers in different drawings identify the same or similar elements.

As noted above, darkness may obscure an object in the field of view of a camera. As a result, an operator (e.g., and/or computer vision) may not be able to discern the object. As the term is used herein, "an operator" includes computer vision. A camera may also illuminate an object with light (e.g., non-visible light) for computer vision, for example. As described below, methods and systems allow for an operator to illuminate a scene. In addition, the illumination method may allow distance to be measured to the object for other purposes, such as autofocusing. Furthermore, the distance may be used to adjust the illumination itself.

Some types of illumination, however, can be dangerous to the human eye at sufficiently high intensity. Near-infrared light, for example, can be dangerous because people cannot perceive the light and the person may not know to adequately protect himself before his eye is permanently damaged. In these cases, some regulations require the illumination source to be placed in locations (e.g., high locations) to reduce the risk of damaging the human eye. That is, some locations are assumed to be at a sufficiently large distance from people that the risk of permanent eye damages is considered acceptably low (i.e., the intensity of light that reaches the eye is sufficiently small).

In one embodiment, a separate distance sensor may be sometimes combined with near-infrared illumination so that the intensity can be lowered (e.g., turned off) when a person comes sufficiently close. These sensors can be expensive, however, and may further complicate the monitoring system. In another embodiment, the illumination source itself (e.g., a laser) may be used to measure the distance to objects. A laser used to illuminate, however, may also be "slow" in that the proper modulation schemes to measure distance can be technically challenging. Using a laser (e.g., instead of an ordinary light emitting diode) enables the emitted light to be easily zoomed or diverged. This property may also be useful when the illuminated scene is to be captured by a zoom focus camera, for example.

Figure 1A:
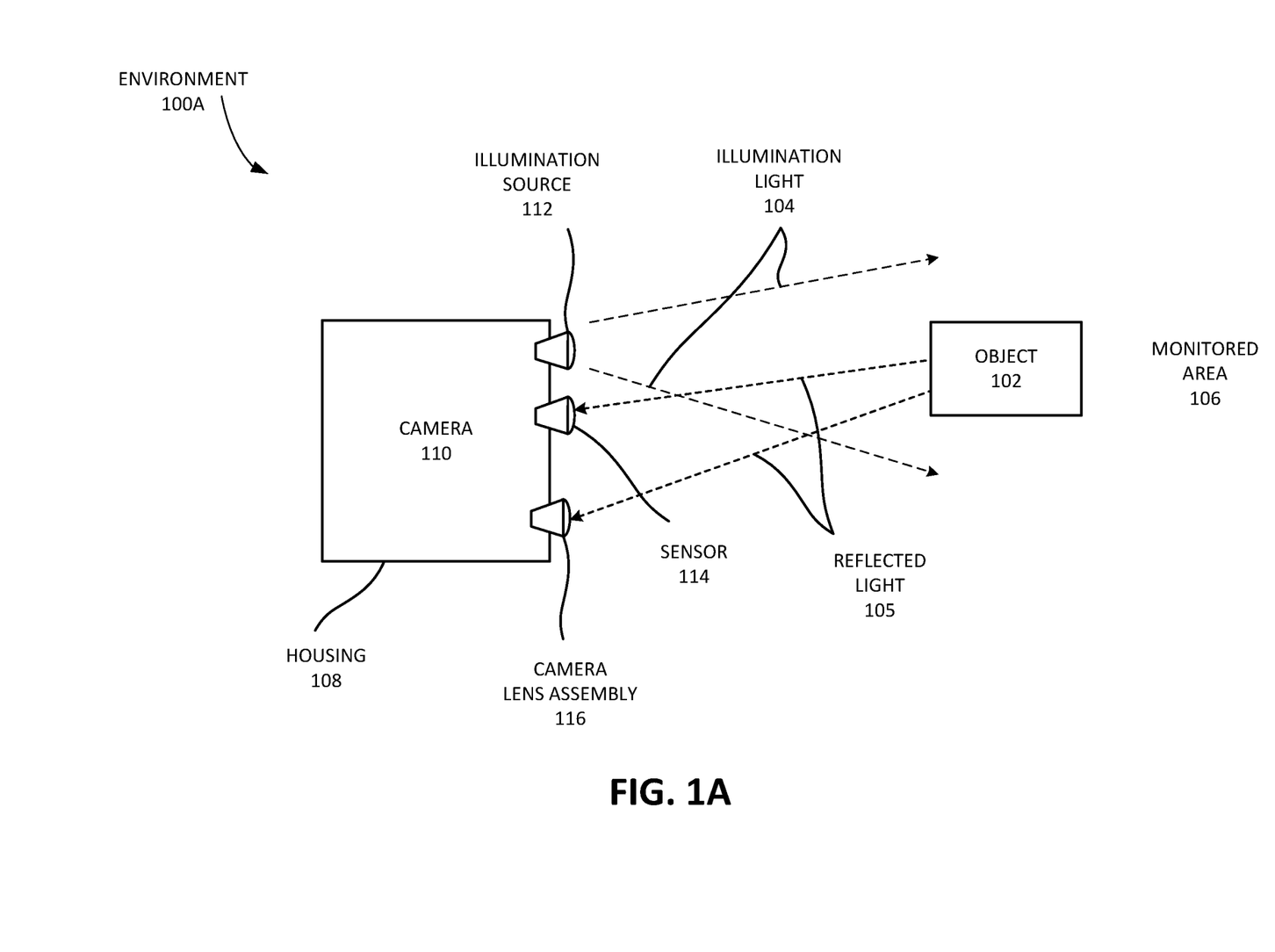
FIG. 1A is a block diagram of an exemplary environment with a camera that monitors an area with an object in one embodiment.

FIG. 1A is a block diagram of an exemplary environment 100A with a camera 110 that monitors an area 106 with an object 102. Environment 100A may be, for example, a security or monitoring system to monitor an area or provide public safety. Object 102 may include a particular object of interest, such as a door, a person, an animal, a vehicle, a license plate, etc.

Camera 110 includes a camera lens assembly 116 and associated sensors to capture images and video in monitored area 106. Camera 110 may include, for example, a video camera that captures image data using visible light, infrared light, and/or other non-visible electromagnetic radiation. The captured image data may include a continuous image sequence (e.g., video), a limited image sequence, still images, and/or a combination thereof. Camera 110 may include a digital camera for capturing and digitizing images and/or an analog camera for capturing images and storing image data in an analog format. As used herein, "video data" and "video" may be referred to more generally as "image data" and "image," respectively. Thus, "image data" or an "image" is meant to include "video data" and "videos" unless stated otherwise. Likewise, "video data" or a "video" may include a still image unless stated otherwise.

Camera 110 may capture image data using visible light, infrared light, and/or other non-visible electromagnetic radiation (e.g., ultraviolet light, infrared light, near-infrared light, terahertz radiation, microwave radiation, etc.). Camera 110 may include a thermal camera and/or a radar for radar imaging. The captured image data may include a continuous image sequence (e.g., video), a limited image sequence, still images, and/or a combination thereof. Camera 110 may include a digital camera for capturing and digitizing images and/or an analog camera for capturing images and storing image data in an analog format.

Camera 110 includes illumination source 112 to illuminate a scene with illumination light 104 (referred to as a "field of illumination"). The field of illumination includes object 102 in this example. Illumination source 112 may include a laser, such as a vertical-cavity surface-emitting laser, a light-emitting diode (LED), an incandescent bulb, and/or a xenon flash. The light emitted from illumination source 112 may include infrared light, near-infrared light, visible light, and/or other frequencies of light. Camera 110 may include other types of illumination sources or more than one illumination source.

Camera 110 includes a sensor 114 that receives light in environment 100. For example, sensor 114 detects reflected light 105, which has reflected off object 102 (e.g., from illumination light 104) in this example. When camera 110 detects low light conditions using sensor 114, camera 110 may increase the output of illumination source 112. Likewise, when camera 110 detects improved light conditions using sensor 114, camera 110 may decrease the output of illumination source 112. Sensor 114 may additionally or alternatively include a distance sensor that detects the distance between camera 110 and object 102. In one embodiment, camera 110 may reduce the output of illumination source 112 if object 102 is determined to be sufficiently close. Camera 110 may include other types of sensors or may include more than one sensor.

Although environment 100A includes a camera 110, camera 110 may take the form of any type of monitoring device, such as motion detector to detect motion in monitoring area 106, a thermal camera to capture thermal images in monitoring area 106, or a heat detector. Such other monitoring devices may also use illumination and/or distance finding.

Figure 1B:
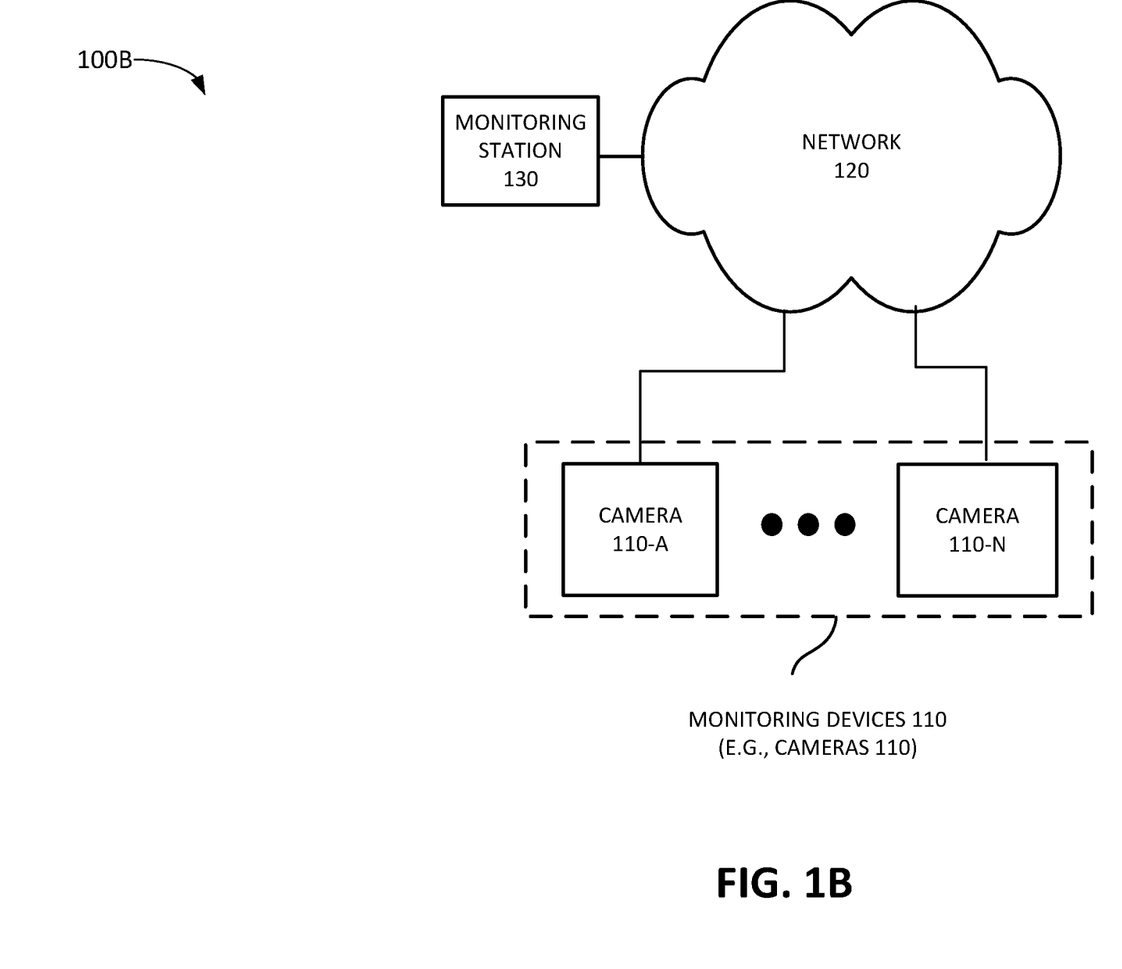
FIG. 1B is a block diagram of another exemplary environment, including multiple cameras, in another embodiment.

Environment 100A of FIG. 1A includes one camera. On the other hand, FIG. 1B is a block diagram of another exemplary environment 100B, including multiple cameras, in another embodiment. As shown in FIG. 1B, environment 100B includes cameras 110-A through 110-N, a network 120, and a monitoring station 130. Cameras 110 are referred to collectively as "cameras 110" and individually as "camera 110." As noted above, cameras 110 may include other types of monitoring devices.

Network 120 enables devices in environment 100B to communicate with each other. For example cameras 110 may communicate with each other and monitoring station 130. Network 120 may enable one camera 110-A to communicate and coordinate illumination with other cameras 110, such as camera 110-N. If object 102, such as a person, is too close to camera 110-A for illumination, camera 110-A may request illumination of object 102 by another camera, such as camera 110-N. Likewise, monitoring station 130 may communicate with any one of cameras 110.

Network 120 may include one or more circuit-switched networks and/or packet-switched networks. For example, network 120 may include a local area network (LAN), a wide area network (WAN), a metropolitan area network (MAN), a Public Switched Telephone Network (PSTN), an ad hoc network, a wireless mesh network, an intranet, the Internet, a fiber optic-based network, a wireless network, and/or a combination of these or other types of networks.

Monitoring station 130 enables an operator to connect to a particular camera 110 to view images and/or video, configure camera 110, and/or otherwise administer camera 110. Monitoring station 130 may also enable an operator to monitor environment 100A (including object 102). For example, an operator may monitor environment 100A for intrusion detection to secure a building.

Monitoring station 130 may include any device configured for communicating with camera 110. As such, an operator may administer any camera 110 from any other camera 110. For example, monitoring station 130 may include a portable communication device (e.g., a mobile smartphone, and/or another type of wireless device); a personal computer or workstation (e.g., with a monitor, keyboard, mouse, etc.); a server device; a laptop, tablet, or another type of portable computer; and/or any type of device with communication capability. In one embodiment, monitoring station 130 may be part of camera 110.

Although FIGS. 1A and 1B show exemplary components of environments 100A and 100B, in other implementations, environments 100A and 100B may include fewer components, different components, differently arranged components, or additional components than depicted in FIGS. 1A and 1B. Additionally or alternatively, any one device (or any group of devices) may perform functions described as performed by one or more other devices.

Figure 2A:
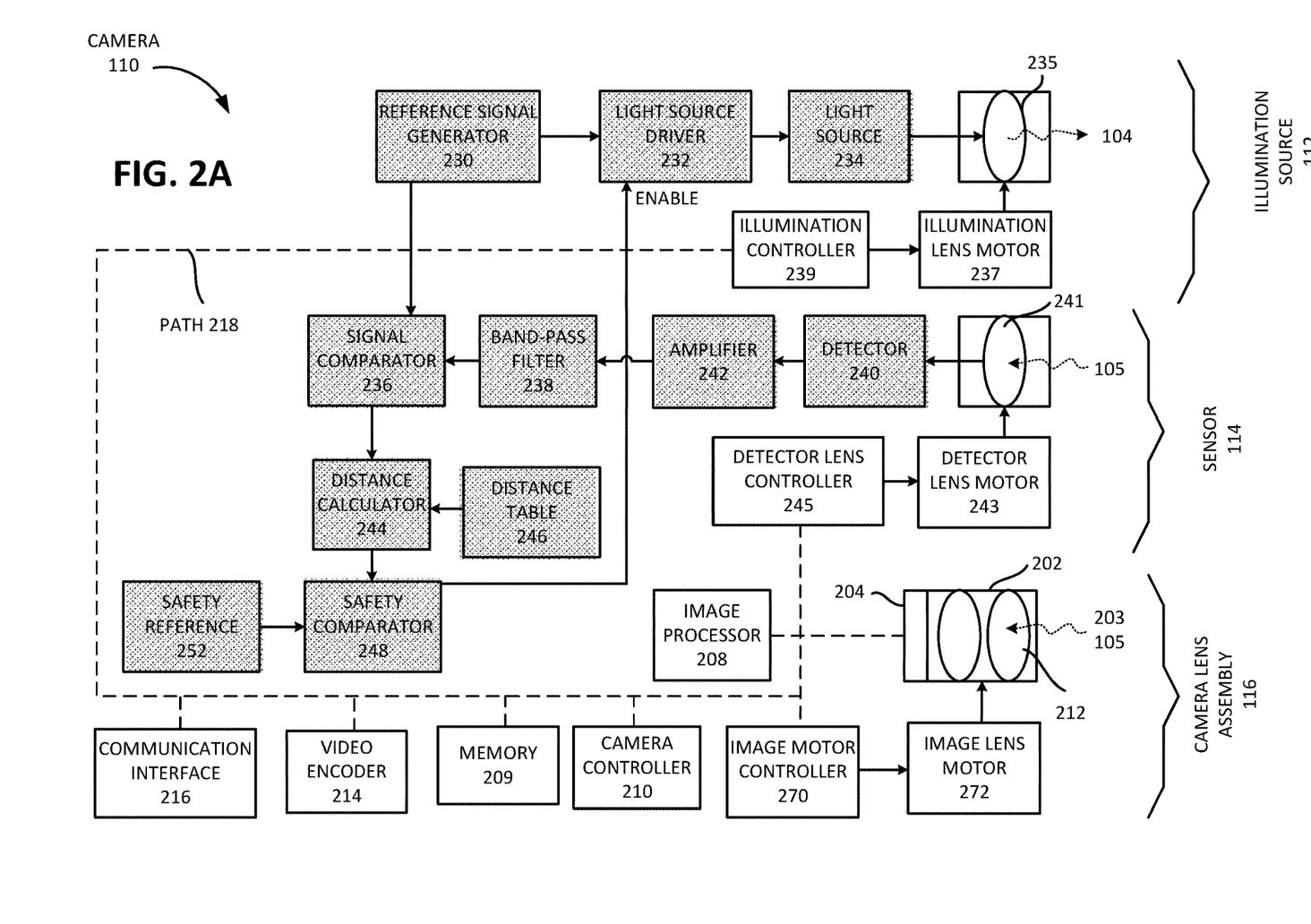
FIG. 2A is a block diagram illustrating exemplary components of the camera of FIGS. 1A and 1B in one embodiment.

FIG. 2A is a block diagram illustrating exemplary components of a camera 110 in one embodiment. In this example, camera lens assembly 116 (see FIG. 1A) includes optics chain 202, sensor array 204, image lens motor 272, and image lens controller 270. Also, illumination source 112 (see FIG. 1A) includes lens 235, light source 234, light-source driver 232, reference signal generator 230, illumination motor controller 239, and illumination lens motor 237. Further, sensor 114 (see FIG. 1A) includes detector lens 241, detector 240, amplifier 242, bandpass filter 238, signal comparator 236, distance calculator 244, and distance table 246. Sensor 144 may also include detector lens controller 245 and detector lens motor 243.

In one embodiment, camera 110 may include a safety component, which includes safety reference 252 and safety comparator 248. Camera 110 may also include other components, such as an image processor 208, camera controller 210, memory 209, video encoder 214, and communication interface 216.

The following components may be implemented in hardware (shown with a darkened background in FIG. 2A): light source 234, light-source driver 232, reference signal generator 230, signal comparator, bandpass filter 238, amplifier 242, detector 240, distance calculator 244, distance table 246, safety reference 252, and/or safety comparator 248. Other components may also be implemented in hardware rather than software, such as detector lens controller 245, illumination motor controller 239, and/or image motor controller.

Optics chain 202 includes an enclosure that directs incident radiation 203, such as reflected light 105, to a sensor array 204 to capture an image based on the incident radiation. Incident radiation 203 may include visible light, infrared light, near-infrared light, millimeter waves, etc. Optics chain 202 includes one or more lenses 212 (referred to in the singular as lens 212) to collect and focus incident radiation 203 from a "field of view" (e.g., in monitored area 106) onto sensor array 204.

Incident radiation 203 passes through lens 212 to focus a field of view onto sensor array 204. The focus and the field of view depends on the physical characteristics of the aperture (not shown) and placement of lens 212, which may be moved by image lens motor 272, which is controlled by image lens controller 270. Image lens motor 272 may include more than one motor (e.g., for more than one lens 212), but is referred to here in the singular.

Sensor array 204 may include an array of sensors for registering, sensing, and measuring radiation (e.g., light) incident or falling onto sensor array 204. The radiation may be in the visible light wavelength range, the infrared wavelength range, or other wavelength ranges. Sensor array 204 may include, for example, a charge-coupled device (CCD) array and/or an active pixel array (e.g., a complementary metal-oxide-semiconductor (CMOS) sensor array). Sensor array 204 may also include a microbolometer (e.g., when camera 110 includes a thermal camera or detector). In alternative embodiments, sensor array 204 may be a linear array that may use scanning hardware (e.g., a rotating mirror) to form images, or a non-array sensor which may rely upon image processor 208 and/or controller 210 to produce image sensor data.

As part of illumination source 112, light source 234 provides the light to illuminate a scene for camera 110 and/or detect the distance from camera 110 to an object. Light source 234 may include a laser, such as a vertical-cavity surface-emitting laser, an LED, a xenon flash, and/or an incandescent bulb. The light emitted from light source 234 may include infrared light, near-infrared light, and/or visible light. Other types of light sources and lasers are possible.

Output from light source 234 may pass through lens 235 to illuminate a field of illumination. Lens 235 may include one or more lenses, but is referred to herein in the singular. Light that is output from light source 234 passes through lens 235 so that the light diverges (illumination light 104 of FIG. 1A) to illuminate a larger area than otherwise without lens 235. The degree of divergence of light depends on the physical characteristics and placement of lens 235, which may be moved by lens motor 237 that is controlled by illumination motor controller 239. Illumination lens motor 237 may include more than one motor (particularly if more than one lens 235 is present), but is referred to herein in the singular. In the implementation in which light source 234 is a laser, divergence of the light output may be more precisely controlled as compared to light output from a LED. In one embodiment, illumination source 112 may be mechanically moved (e.g., for scanning monitored area 106) in addition to, or instead of, using diverging lens 235.

Light source 234 may use frequencies other than near-infrared, such as microwave or ultraviolet. The smaller wavelength of light (e.g., as output from a laser) allows the light to be focused into a smaller spot (e.g., a field of illumination), which can increase spatial resolution. Furthermore, a narrow optical bandpass filter (not shown in FIG. 2A) can provide a way to filter out light of wavelengths other than the wavelength used. This can reduce noise and increase the signal-to-noise ratio (SNR).

In one embodiment, the illumination of a "field of illumination" (by illumination light 104) may correspond to the field of view being focused on by optics chain 202 and lens 212 (e.g., captured by sensor array 204). In other words, if sensor array 204 is sensing a narrow field of view at a distance, then illumination light 104 may illuminate that same narrow field of view at the distance. In other words, the field of illumination may be matched to the field of view for camera sensor array 204. Stated another way, the field of illumination by light source 234 (as controlled by lens 235) may match the field of view being focused on (by lens 212) and captured by sensor array 204.

Light-source driver 232 drives (i.e., provides the voltage and current to) light source 234. The intensity of light output from light source 234 depends, for example, on the voltage and/or current supplied to it by light-source driver 232. In one embodiment, light-source driver 232 drives light source 234 when it receives an ENABLE signal; and does not drive light source 234 when it does not receive an ENABLE signal. For example, light-source driver 232 only drives light source 234 when it receives an ENABLE signal. In this embodiment, safety comparator 248 outputs an ENABLE signal when safety comparator 248 determines that conditions are safe; and safety comparator 248 does not output an ENABLE signal (or outputs NOT ENABLE signal) when safety comparator 248 determines that conditions are not safe.

Reference signal generator 230 generates a reference signal, which is output to light source driver 232. Reference signal may also be referred to as a "modulation signal." The reference signal allows driver 232 to modulate, in accordance with the reference signal, the intensity of light emitted from light source 234. In other words, light-source driver 232 can vary the current and/or voltage output to light source 234 based on the reference signal. In these cases, the light (e.g., near-infrared light) is a carrier signal to the reference signal. The reference signal may take different forms in different implementations. For example, reference signal may be sinusoidal or include pulses (e.g., chipping pulses). As a sinusoidal signal, the frequency of reference signal may range between 0.1 MHz and 100 MHz, for example. In one implementation, the modulation signal (i.e., the reference signal) is such that the modulation of illumination light 104 is of low enough amplitude and high enough frequency as not to induce interference in images taken by camera 110. That is, reducing the amplitude of modulation and increasing the frequency of modulation of light 104 can reduce the speckling of images captured by camera 110.

As part of sensor 114, detector 240 senses light, such as light emitted from light source 234 and reflected off object 102. Detector 240 may include a photo detecting diode and/or a charge-coupled device (CCD), for example. In one embodiment, detector 240 outputs an analog signal that is proportional to the intensity of light that impinges on detector 240. As a result, detector 240 effectively demodulates a carrier signal (if any is present on reflected light 105) by stripping off the carrier signal (i.e. light).

In one implementation, light received by detector 240 passes through detector lens 241 so that the light from a "field of detection" converges (or is focused) onto detector 240. Lens 241 may include more than one lens, but is referred to herein in the singular. The degree of convergence of light depends on the aperture and the physical characteristics and placement of detector lens 241, which may be moved by detector lens motor 243 that is controlled by detector lens controller 245. Illumination lens motor 237 may include more than one motor (particularly if more than one lens 235 is present), but is referred to herein in the singular.

In one embodiment, the detection of light in a field of detection of sensor 114 (as controlled by lens 241) may match the field of view being focused on (e.g., by camera lens assembly 116) and captured by sensor array 204. In other words, if sensor array 204 is capturing a particular field of view at a distance, then detector 240 (in combination with lens 241) may detect light from that particular field of view at that distance. Additionally or alternatively, if illumination light 104 diverges to a particular field of illumination at a distance, then sensor 114 (in combination with lens 241) may detect light from the particular field of illumination at that distance. In other words, the field of detection by sensor 114 may match the field of illumination and/or may match the field of view captured by camera lens assembly 116. In some embodiments, the field of detection for sensor 114 does not correspond to the field of illumination, and/or does not correspond to the field of view for camera lens assembly 116. For example, the field of detection may be larger than the field of illumination; or the field of detection may be smaller than the field of illumination.

In another embodiment, lens 241 may be a fixed-focus lens without a detector lens motor 243 or a detector lens controller 245. In this embodiment, the field of detection for the detector 240 is more omni-directional than with a lens that can be moved by detector lens motor 243 and detector lens controller 245 and the field of detection for sensor 114 may be broader than the field of illumination for illumination source 112. In yet another embodiment, detector 240 shares lens 235 with light source 234 so that the field of illumination is the same as the field of detection for sensor 114. In yet another embodiment, lens 241 may be omitted altogether and detector 240 is not associated with a lens.

Because reflected light 105 may be weak, the output of detector 240 may also be weak. In one implementation, the output of detector 240 is amplified by amplifier 242 to increase signal strength. Bandpass filter 238 inputs the signal from amplifier 242 and strips away noise and/or isolates the desired frequencies (e.g., frequencies corresponding to the reference signal). The output of bandpass filter 238 is passed to signal comparator 236. The output of bandpass filter 238 may be referred to as the "demodulated signal."

Signal comparator 236 compares reference signal (i.e., output from reference signal generator 230) with the demodulated signal (output from bandpass filter 238). In one embodiment, the output of the signal comparator 236 is proportional to the distance to object 102 that reflected illumination light 104 (as reflected light 105). Different techniques can be used for comparing the reference signal to the demodulated signal. For example, if the reference signal is sinusoidal, then signal comparator 236 (e.g., an interferometer) may output the phase difference between the reference signal and the demodulated signal that is proportional to the distance to the object. In another embodiment, the reference signal may include chirped laser pulses. In one implementation, signal comparator 236 uses coherent detection, in which mixing operations are done in the optical domain. Coherent detection may be used in a phase detection system and when chirped laser pulses are used.

In one implementation, signal comparator 236 includes a quadrature phase detector. If the reference signal is sinusoidal with a frequency fm, then the demodulated signal also has a frequency of fm (assuming a non-moving object 102) but with a phase difference due to the fact that the signal has traveled the distance d to object 102 and back again. The phase difference can be measured using a mixer (e.g., interferometer). A mixer is a device whose input is two periodic signals, with frequencies f1 and f2, and whose output are signals with the difference and sum frequencies as well as harmonics. This is achieved through multiplying the input signals in the time domain. A nonlinear device can be used as a mixer. In one embodiment, measuring the phase difference may include an analog mixing of the reference and received signals. The mixed analog signal may be used as feedback for threshold detection.

A quadrature phase detector may allow for both the phase difference θ and reflectance of object 102 to be measured. Reflectivity may be used to complement and enhance distance measurement, providing an additional dimension and degree of freedom. This may be taken advantage of in the form of determining the presence of some specific objects (e.g., a human), or even classification of objects present, rather than just measuring the distance to them. Furthermore, a quadrature phase detector allows for distance calculations to be performed rapidly (e.g., by a hardware circuit). Because these measurements are based on the phase of continuous waves, high measurement rates (e.g., measuring distance at a rate of 8 kHz, depending on modulation frequency fm) are possible.

Distance calculator 244 may determine the distance from camera 110 to object 102 based on the signal output from the signal comparator 236. If signal comparator 236 outputs a phase difference, for example, then distance calculator 244 may access distance table 246 to determine the corresponding distance (or distances) to object 406. If the distance is ambiguous (i.e., more than one solution), then reference signal generator 230 may alter the reference signal (e.g., to a different frequency) to resolve any ambiguity. That is, a scheme to resolve ambiguity may include using a combination of different modulation frequencies that are not harmonics of each other. Distance calculator 244 may include, for example, digital logic (e.g., a digital processor) and/or analog logic (an analog processor).

In one implementation, distance calculator can measure distances of up to 27 meters with an accuracy having a standard deviation of 15 centimeters with a measurement speed of 8 kHz. A sinusoidal reference signal between 10 and 90 MHz allows for a calculated distance between 10 and 30 meters, for example. A sinusoidal reference signal between 100 MHz to 1 GHz may allow for calculated distances accurate to the centimeter. A sinusoidal reference signal of approximately 1 MHz may allow for calculated distances in the hundreds of meters. Implementations described herein may use combinations of these frequencies.

In one implementation, signal comparator 236 includes a time-of-flight detector. With this implementation, the reference signal may include short pulses of intensity. Signal comparator 236 may then measure a time for the pulses to return (e.g. by comparing the received signal with the reference signal). If signal comparator 236 outputs a time-of-flight, distance calculator 244 may determine distance by multiplying the time-of-flight by the speed of light, and dividing by two. Using time-of-flight may allow for distance measurement rates of 500 kHz.

Safety comparator 248 compares the calculated distance to a safety threshold. In this implementation, safety reference 252 is the minimum distance deemed safe for a human being illuminated by illumination light 104. In one embodiment, safety reference 252 may include a table of safe distances and corresponding light intensity. Safety comparator 248 may disable continued illumination by light source 234 if the calculated distance is less than the corresponding safety reference 252. Safety comparator 248 may enable continued illumination by light source 234 if the calculated distance is greater than safety reference 252. Although safety reference 252 can be a constant, it may also be a factor that depends on numerous factors, such as the degree of divergence of light from light source 234 and/or the intensity of light emitted by light source 234. Safety comparator 248 may include, for example, digital logic (e.g., a processor) and/or analog logic.

In one implementation, many of the components shown in FIG. 2A may be implemented in hardware rather than software. In this implementation, safety comparator 248 may command light-source driver 232 to attenuate or deactivate light source 234 based on detected light rapidly without the involvement of a general processor. For example, a general processor running software could potentially be overburdened with requests (such as for image processing). As another example, the operating system (running in the general processor) may crash as a result of buggy software not related to safety. Thus, in one implementation, the following components may be implemented in hardware (shown with a darkened background in FIG. 2A): light source 234, light-source driver 232, reference signal generator 230, signal comparator, bandpass filter 238, amplifier 242, detector 240, distance calculator 244, distance table 246, safety reference 252, and/or safety comparator 248. Other components may also be implemented in hardware rather than software, such as detector lens controller 245, illumination motor controller 239, and/or image motor controller.

Components of camera 110 that may be implemented in software running in a general processor, a dedicated processor, and/or a specialized processor include, for example: image processor 208, video encoder 214, and/or camera controller 210. These components may be connected to data path 218 (dashed line in FIG. 2A) in camera 110 to allow software and/or hardware components of camera 110 to communicate with each other. For example, camera controller 210 may instruct detector lens controller 245 via data path 218 to move lens 241 with detector lens motor 243. Camera controller 210 may receive a calculated distance from distance calculator 244. Camera controller 210, video encoder 214, and image processor 208 may also receive image data from camera sensor array 204.

Camera sensor array 204 outputs data that is indicative of (e.g., describes properties or characteristics) the radiation (e.g., light) incident on sensor array 204. In the example of FIG. 2A, sensor array 204 output the data onto data path 218 for other components in camera 110 to process. The data output from sensor array 204 may include information such as the intensity of light (e.g., luminance), color, etc., incident on one or more pixels in sensor array 204. The light incident on sensor array 204 may be an "image" in that the light may be focused as a result of lenses in optics chain 202.

Sensor array 204 can be considered an "image sensor" because it senses electromagnetic radiation (e.g., light) impinging ling on sensor array 204 and converts the radiation into a multidimensional data signal. As the term is used herein, an "image" includes the data indicative of the radiation (e.g., describing the properties or characteristics of the light) incident on sensor array 204. Accordingly, the term "image" may also be used to mean "image sensor data" or any data or data set describing an image.

Video encoder 214 may encode image sensor data for transmission to another component in camera 110 or other devices in environment 100, such as monitoring station 130. Video encoder 214 may use video coding techniques such as video coding standards of the ISO/MPEG or ITU-H.26X families.

Camera controller 210 and/or image processor 208 perform signal processing operations on image data captured by sensor array 204. Controller 210 and/or image processor 208 may include any type of single-core or multi-core processor, microprocessor, latch-based processor, and/or processing logic (or families of processors, microprocessors, and/or processing logics) that interpret and execute instructions. Controller 210 and/or image processor 208 may include or be coupled to a hardware accelerator, such as a graphics processing unit (GPU), a general purpose graphics processing unit (GPGPU), a Cell, a field programmable gate array (FPGA), an application specific integrated circuit (ASIC), and/or another type of integrated circuit or processing logic.

Figure 2B:
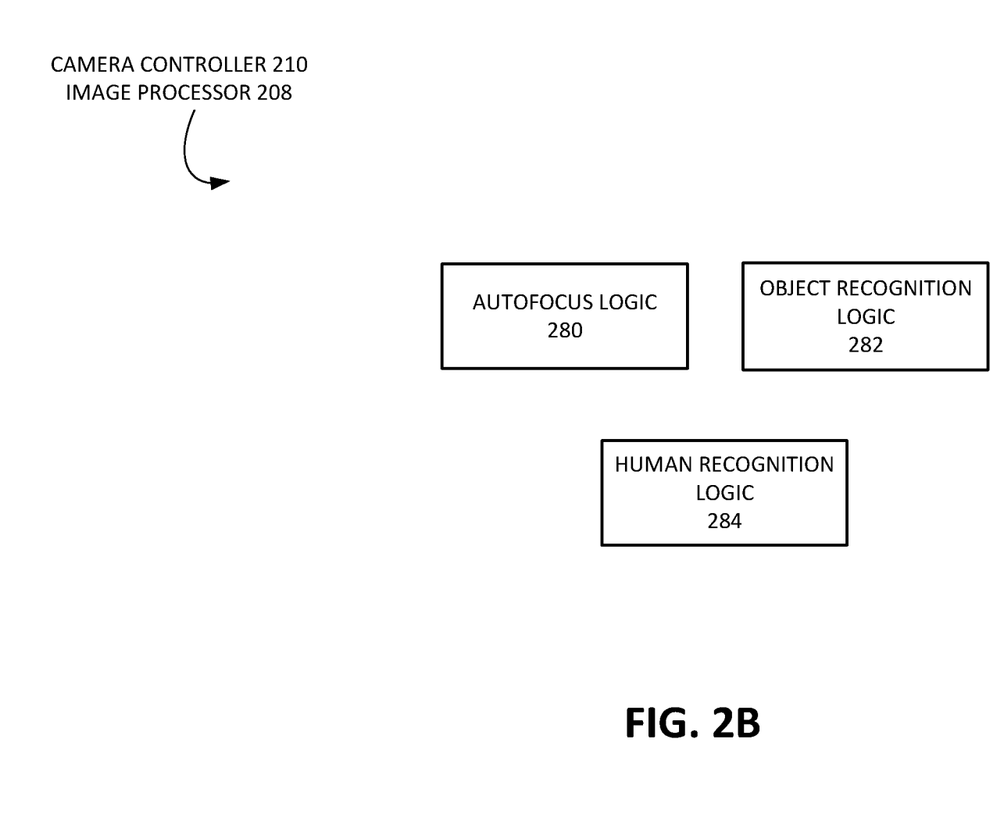
FIG. 2B is a block diagram illustrating exemplary components of the camera controller of FIG. 2A.

Controller 210 may also determine and control the desired focus and position (e.g., tilt and zoom) of camera 110. To do so, controller 210 sends commands to image motor controller 270 to drive motors 220 to tilt and/or pan camera 110 or optically zoom lenses 212. FIG. 2B is a block diagram illustrating exemplary components of camera controller 210 and/or image processor 208. As shown in FIG. 2B, camera controller 210 and/or image processor 208 includes autofocus logic 280, object recognition logic 282 and/or human recognition logic 284.

Autofocus logic 280 controls (e.g., includes an algorithm to control) the desired focus of camera lens assembly 116. In one embodiment, the autofocus algorithm is based on contrast and the calculated distance (e.g., from distance calculator 244) may be used to set a lower and an upper bound for the algorithm. A difference between the lower and upper bound is set based on the signal strength of the received signal such that low signal quality results in a large difference (broad range) and good signal quality results in a small difference (narrow range).

Object recognition logic 282 may detect objects in images (such as object 102) and the boundaries of objects in images. Human recognition logic 284 may detect humans and/or faces of people, for example, in images.

Memory 209 may include any type of volatile and/or non-volatile storage device that stores information and/or instructions. Memory 209 may include a random access memory (RAM) or any type of dynamic storage device, a read-only memory (ROM) device or any type of static storage device, a magnetic or optical recording memory device and its corresponding drive, or a removable memory device. Memory 209 may store information and instructions (e.g., applications and/or an operating system) and data (e.g., application data) for use by camera 110.

Memory 209 may store instructions for execution by controller 210 and/or image processor 208. The software instructions may be read into memory 209 from another computer-readable medium or from another device. The software instructions may cause controller 210 and/or image processor 208 to perform processes described herein. For example, camera 110 may perform operations relating to the image processing (e.g., encoding, transcoding, detecting objects, etc.) in response to controller 210 and/or image processor 208 executing software instructions stored in memory 209. Alternatively, hardwired circuitry (e.g., logic) may be used in place of, or in combination with, software instructions to implement processes described herein.

Communication interface 216 includes circuitry and logic circuitry that includes input and/or output ports, input and/or output systems, and/or other input and output components that facilitate the transmission of data to another device. For example, communication interface 216 may include a network interface card (e.g., Ethernet card) for wired communications or a wireless network interface (e.g., a WiFi) card for wireless communications.

Although FIGS. 2A and 2B show exemplary components of camera 110, in other implementations, camera 110 may include additional components, fewer components, different components, and/or differently arranged components than depicted in FIGS. 2A and 2B. Additionally or alternatively, one or more components of camera 110 may perform functions described as performed by one or more other components of camera 110. For example, controller 210 may perform functions described as performed by image processor 208 and vice versa. Alternatively or additionally, camera 110 may include a computing module as described below with respect to FIG. 3. In one embodiment, camera 110 may include one or more motor controllers (e.g., three) and one or more motors 220 (e.g., three) for panning, tilting, and zooming camera 110.

Figure 3:
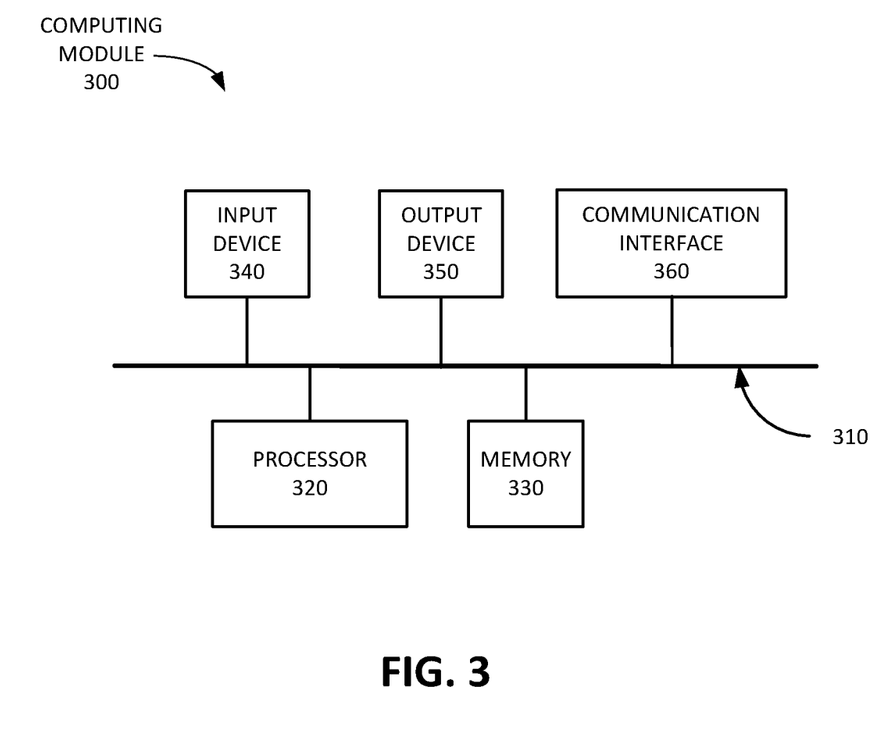
FIG. 3 is a block diagram illustrating exemplary components of a computing module in one embodiment.

FIG. 3 is a block diagram illustrating exemplary components of a computing module 300 in one embodiment. Devices such as camera 110, image processor 208, camera controller 210, and/or monitoring station 130 may include one or more computing modules 300. As shown in FIG. 3, computing module 300 may include a bus 310, a processor 320, a memory 330, and/or a communication interface 360. In some embodiments, computing module 300 may also include an input device 340 and/or an output device 350.

Bus 310 includes a path that permits communication among the components of computing module 300 or other devices. Processor 320 may include any type of single-core processor, multi-core processor, microprocessor, latch-based processor, and/or processing logic (or families of processors, microprocessors, and/or processing logics) that interprets and executes instructions. Processor 320 may include an ASIC, an FPGA, and/or another type of integrated circuit or processing logic. Processor 320 may include or be coupled to a hardware accelerator, such as a GPU, a GPGPU, a Cell, a FPGA, an ASIC, and/or another type of integrated circuit or processing logic.

Memory 330 may include any type of volatile and/or non-volatile storage device that stores information and/or instructions. Memory 330 may include a RAM or any type of dynamic storage device, a ROM or any type of static storage device, a magnetic or optical recording memory device and its corresponding drive, or a removable memory device. Memory 330 may store information and instructions (e.g., applications and an operating system) and data (e.g., application data) for use by processor 320.

Memory 330 may store instructions for execution by processor 320. The software instructions may be read into memory 330 from another computer-readable medium or from another device. The software instructions may cause processor 320 to perform processes described herein. Alternatively, hardwired circuitry (e.g., logic) may be used in place of, or in combination with, software instructions to implement processes described herein.

The operating system may include software instructions for managing hardware and software resources of computing module 300. For example, the operating system may include Linux, Windows, OS X, Android, an embedded operating system, etc. Applications and application data may provide network services or include applications, depending on the device in which the particular computing module 300 is found.

Communication interface 360 may include a transmitter and/or receiver (e.g., a transceiver) that enables computing module 300 to communicate with other components, devices, and/or systems. Communication interface 360 may communicate via wireless communications (e.g., radio frequency, infrared, etc.), wired communications, or a combination thereof. Communication interface 360 may include a transceiver that converts baseband signals to radio frequency (RF) signals or vice versa and may be coupled to an antenna.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications or a wireless network interface (e.g., a WiFi) card for wireless communications.

Some devices may also include input device 340 and output device 350. Input device 340 may enable a user to input information into computing module 300. Input device 370 may include a keyboard, a mouse, a pen, a microphone, a camera, a touch-screen display, etc.

Output device 350 may output information to the user. Output device 350 may include a display, a printer, a speaker, etc. Input device 340 and output device 350 may enable a user to interact with applications executed by computing module 300. In the case of a "headless" device (such as a deployed remote camera), input and output is primarily through communication interface 360 rather than input device 340 and output device 350.

If camera 110 is implemented with a computing module 300, then data path 218 (described with respect to FIG. 2A) may include bus 310. In this implementation, video encoder 214, image processor 208, and/or camera controller 210 may include a GPU, GPGPU, a Cell, a FPGA, and/or an ASIC, for example. In addition, in one embodiment, computing module 300 (e.g. processor 320) may perform the functions of any of the functions of camera 110 shown in FIGS. 2A and 2B. Further, in this implementation, communication interface 216 (FIG. 2A) may be implemented as communication interface 360 (FIG. 3), for example.

Computing module 300 may include other components (not shown) that aid in receiving, transmitting, and/or processing data. Moreover, other configurations of components in computing module 300 are possible. In other implementations, computing module 300 may include fewer components, different components, additional components, or differently arranged components than depicted in FIG. 3. Additionally or alternatively, one or more components of computing module 300 may perform one or more tasks described as being performed by one or more other components of computing module 300.

Figure 4:
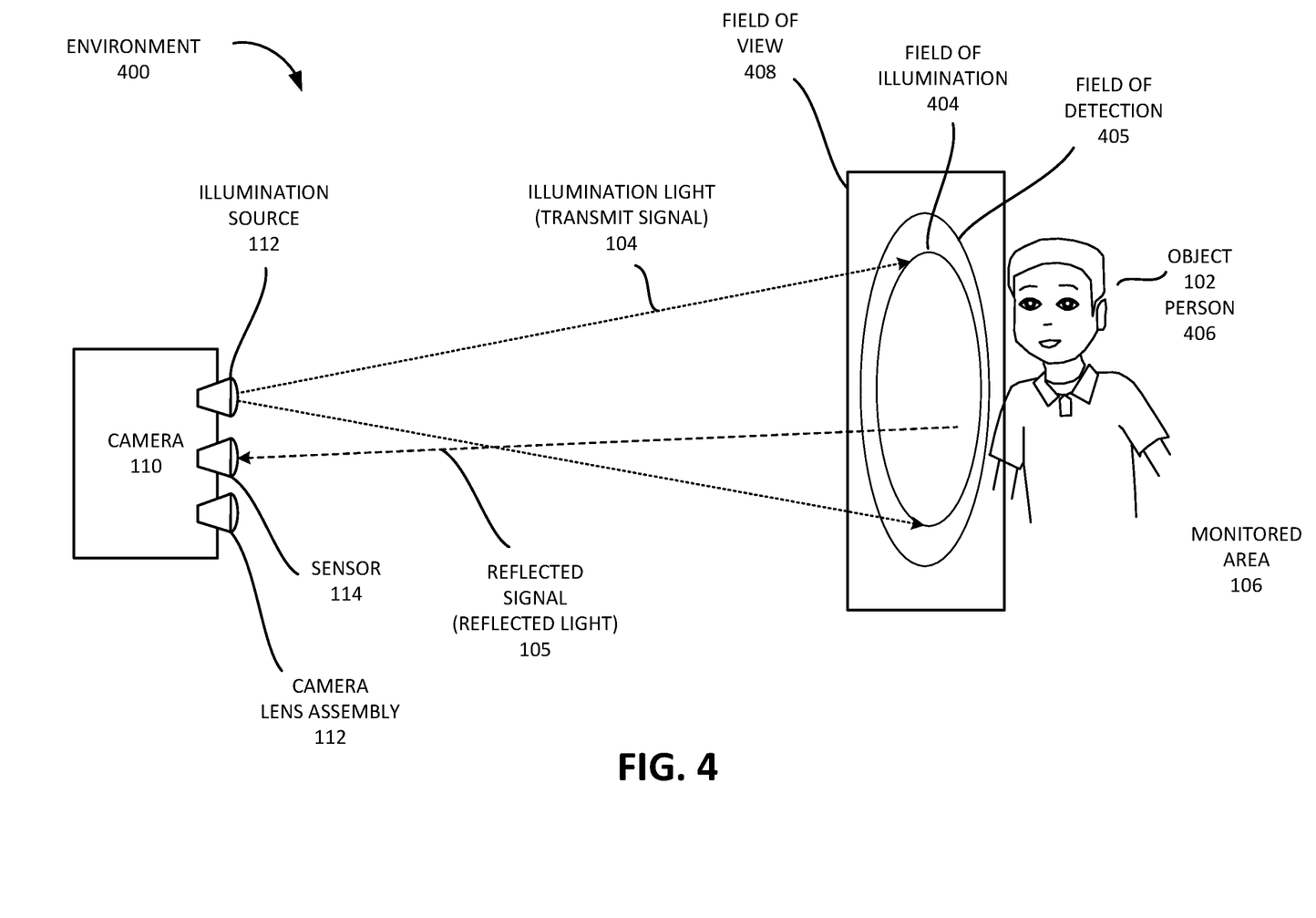
FIG. 4 is a block diagram of an exemplary environment, similar to the environment of FIG. 1, but with a person as the object.

FIG. 4 is a block diagram of an exemplary environment 400, similar to environment 100A, but with person 406 as object 102 in monitored area 106. Environment 400 is used to describe process 500, which is shown as a flowchart in FIG. 5. Process 500 can be run in or by camera 110 and is described with the following example of FIG. 4: person 406 (i.e., object 102) stands in monitored area 106; camera lens assembly 116 focuses on a field of view 408; illumination source 112 illuminates field of illumination 404 with illumination light 104; and sensor 114 detects reflected light 105 (i.e., illumination light 104 reflected off person 406) as sensor 114 also focuses on field of detection 405.

Figure 5:
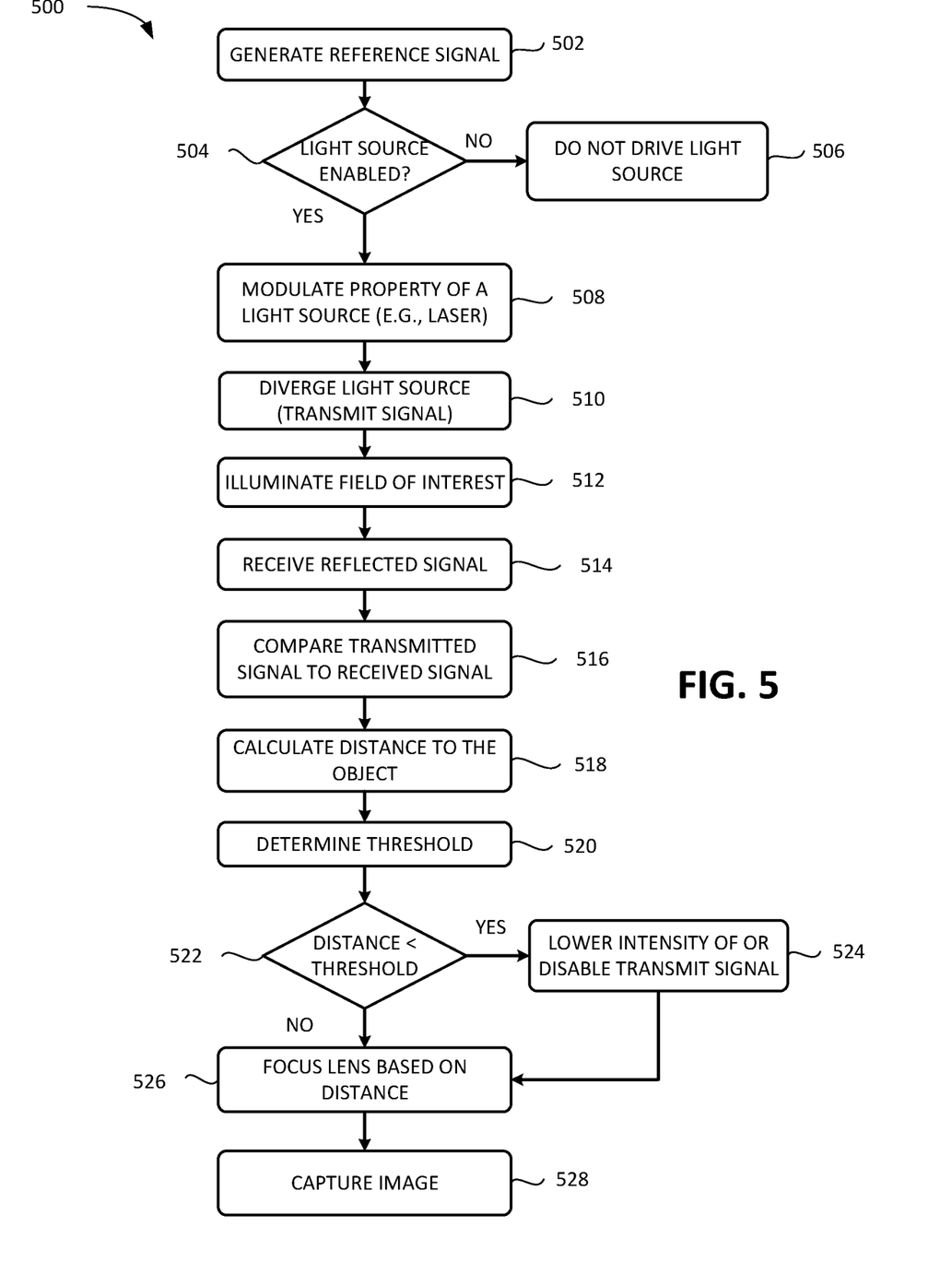
FIG. 5 is a flowchart of a process for illuminating a scene and range finding with a laser in one embodiment.

Process 500 begins by generating a reference signal (block 502) for modulating a property of a light source. Referring to FIG. 2A, reference signal generator 230 generates the reference signal. The reference signal may be sinusoidal, for example. Other possibilities for a modulation signal may include a chipping reference signal.

If light source 234 is not enabled (block 504: NO), then light-source driver 232 does not drive light source 234 and no illumination signal is emitted from camera 110. An example of light source 234 not being enabled is when safety comparator 248 outputs a NOT ENABLE signal to light-source driver 232. Safety comparator 248 may output a NOT ENABLE signal when, for example, safety comparator 248 determines that a human is too close to camera 110 given the intensity of the light that would impinged on the human. In another embodiment, light-source driver 232 may instead reduce the intensity of illumination light 104 to be in an acceptable safety range (i.e., rather than not emitting illumination source 112 at all).

On the other hand, if light source 234 is enabled (block 504: YES), then light-source driver 232 drives light source 234 (e.g., a laser) in accordance with the reference signal output from reference signal generator 230 (block 508). In other words, light-source driver 232 modulates a property of the light source 234 (e.g., a laser) in accordance with the reference signal. An example of light source 234 being enabled is when safety comparator 248 outputs an ENABLE signal to light-source driver 232. Safety comparator 248 may output an ENABLE signal when, for example, safety comparator 248 determines that any human is sufficiently far away from camera 110 given the intensity of illumination light 104.

Referring again to FIG. 2A, light source 234 (e.g., a laser) may emit a near-infrared light that is driven by light-source driver 232. Light source-driver 232 modulates the intensity of the light being emitted by light source 234 based on a reference signal generated by reference signal generator 230. That is, the near-infrared frequency is a carrier of the reference signal. As a result of the modulation, the intensity of the light emitted by light source 234 may vary with time. In one embodiment, modulation includes changing the intensity of the light by one-tenth or one-twentieth. Depending on the reference signal, modulating may include chipping, frequency modulation, and/or amplitude modulation. For example, the frequency of the change of intensity may change and/or the amplitude of the intensity may change.

Light from light source 234 may be diverged (block 510). In this embodiment, lens 235 spreads the light from light source 234 (e.g., laser light). Illumination motor controller 239 may determine the degree of divergence of laser light according to a distance and/or field of illumination calculation. Illumination motor controller 239 may then instruct illumination lens motor 237 to move lens 235 accordingly. As shown in FIG. 4, field of illumination 404 is illuminated (block 512) with illumination light 104, which includes person 406. Illumination light 104 may also be referred to as a transmit signal 104.

Illumination light 104 (transmit signal 104) reflects off one or more objects and is received by sensor 114 (block 514). Referring to FIG. 4, illumination light 104 reflects off person 406 as reflected light 105, which passes through detector lens 241 and impinges on detector 240. In this example, field of detection 405 for detector lens 241 matches the field of illumination 404. The field of detection 405 for sensor 114 is determined by detector lens controller 245 instructing detector lens motor 243 to move lens 241. Reflected light 105 may also be referred to as "reflected signal 105" or "received signal 105."

Because reflected signal 105 may be weak, the output of detector 240 may also be weak, and the output of detector 240 is amplified by amplifier 242. In this implementation, the output of detector 240 is an analog signal that is proportional to the intensity of light that impinges on detector 240. That is, detector 240 effectively demodulates reflected signal 105 by stripping out the carrier frequency (e.g., the near-infrared frequencies). Further, the output of amplifier 242 may be filtered by a bandpass filter 238 to strip out noise and isolate the desired frequencies (e.g., frequencies that correspond to the reference signal). The output of bandpass filter 238 may be referred to as the "demodulated signal."

Process 500 continues with a comparison (block 516) of the transmitted signal (e.g., the reference signal) to the received signal (e.g., the demodulated signal output from bandpass filter 238). In this implementation, the output of the signal comparator 236 is proportional to the distance to the object that reflected illumination light 104. Different techniques can be used for comparing the reference signal to the demodulated signal. For example, if the reference signal is sinusoidal, then signal comparator 236 (e.g., an interferometer) may output the phase difference between the reference signal and the demodulated signal that is proportional to the distance to object 102. In another embodiment, if the reference signal includes pulses, time of flight of pulses is proportional to the distance to object 102.

The distance to the object is calculated (block 518). If signal comparator 236 outputs the phase difference, for example, then distance calculator 244 may access distance table 246 to determine the corresponding distance (or distances) to person 406 based on the phase difference. If the distance is ambiguous (i.e., more than one reasonable solution), then the reference signal may be altered (e.g., to a different frequency) to resolve any ambiguity. That is a scheme to resolve ambiguity may include using a combination of different modulation frequencies that are not harmonics of each other.

If signal comparator 236 outputs a time-of-flight, for example, then distance calculator 244 may access distance table 246 to determine the corresponding distance to person 406 based on the time-of-flight.

The distance threshold is determined (block 520). If the distance to person 406 is less than the threshold (block 522: YES), then the intensity (or average intensity) of the illumination light 104 may be lowered accordingly (block 524). Safety comparator 248 performs the comparison of the safety reference 252 to the distance to person 406. In one embodiment, if the distance to person 406 is less than the threshold, then safety comparator 248 outputs NOT ENABLE to disable light-source driver 232, which turns off light source 234 and removes illumination light 104. In another embodiment, safety comparator 248 outputs a signal to allow light-source driver 232 to reduce the intensity of illumination light 122 so as not to be dangerous assuming a person is at the calculated distance (calculated in block 518). Once the intensity is lowered, process 500 may proceed to block 526 described below.

If the distance to object 406 is greater than the threshold (block 522: YES), the intensity of the transmit signal is not lowered, and lens controller 270 may command lens motor 272 to focus lens 212 accordingly based on the calculated distance (block 522). That is, process 500 may use the calculated distance as a reference point for an autofocus algorithm. In addition, an image may be captured (block 528). In the example of FIG. 4, process 500 captures in camera 110 an image that includes the field of view illuminated by illumination light 104 (i.e., transmit signal 104). In one embodiment, methods and systems described herein may be used for illumination without necessarily capturing an image. That is, one device (e.g., including illumination source 112 and sensor 114) may provide illumination and a separate device may include camera lens assembly 116 for capturing images.

Figure 6:
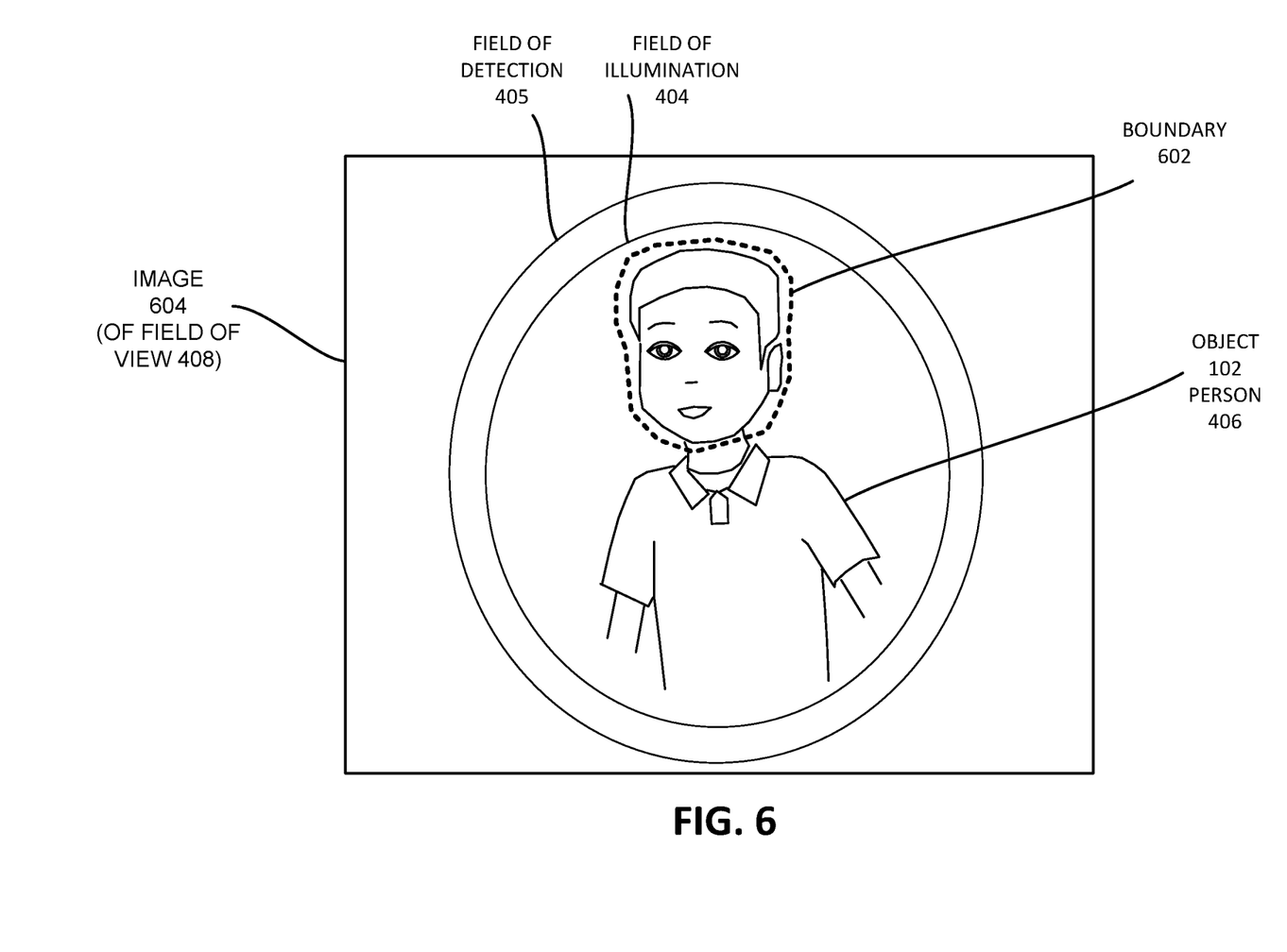
FIG. 6 is a diagram illustrating object, boundary, and human recognition in one embodiment.
Figure 7:
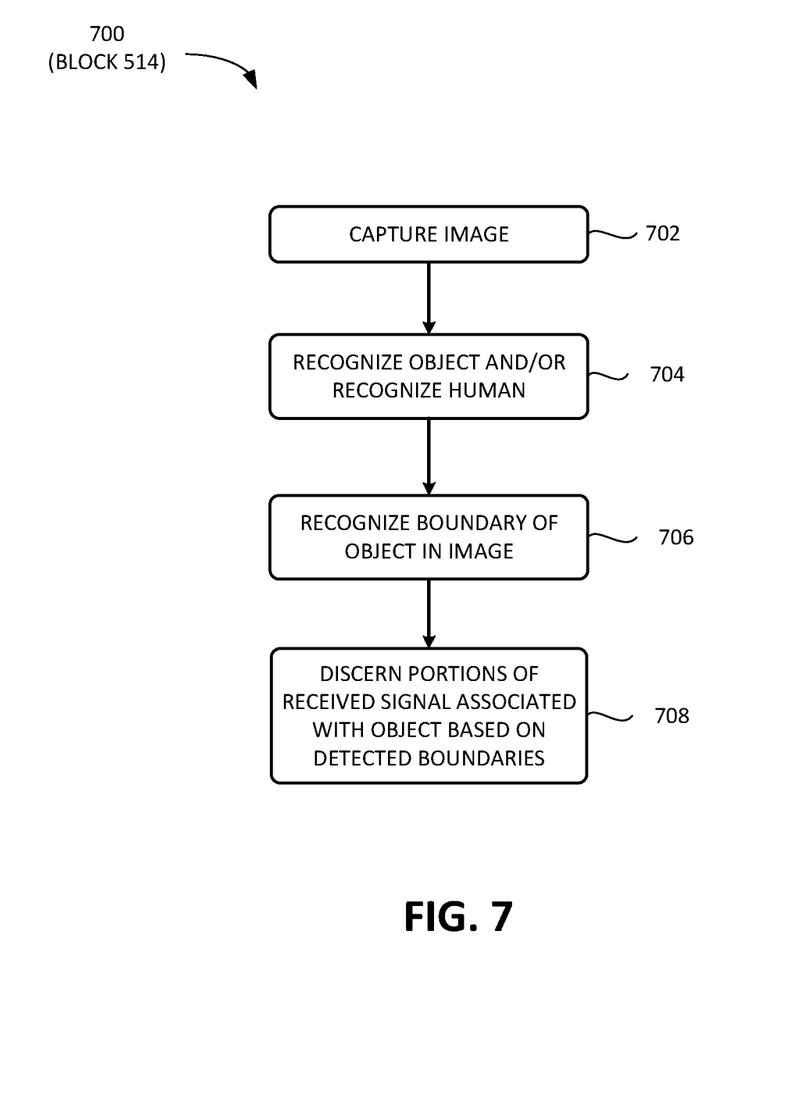
FIG. 7 is a flowchart of a process for range finding with a laser in another embodiment.

FIG. 7 is a flowchart of a process 700 for range finding with a laser in another embodiment. Process 700 is described with respect to the example shown in FIG. 6, which illustrates object, boundary, and human recognition in one embodiment. Process 700 elaborates on receiving the reflected signal (block 514) when reflected signal 105 is received as part of an image.

Process 700 begins with the capture of an image (block 702). As shown in FIG. 6, camera 110 captures image 604 of field of view 408 (see FIG. 4). That is, camera lens assembly 116 receives reflected light 105 through optics chain 202 (i.e., lens 212) and light 105 impinges on sensor array 204 (e.g., a CCD sensor). The image data travels over path 218 to memory 209 and can be processed by image processor and/or camera controller 210.

Process 700 continues with the recognizing of an object and/or a human in the image (block 704). In the example of FIG. 6, object recognition logic 282 recognizes object 102, which happens to be a human, in image 604. If an object and/or human is detected, the boundaries of the object and/or human can be determined (block 706). As shown in FIG. 6, the boundary 602 of a human face is detected. The received signal associated with the object and/or human are discerned (block 708) and used as the demodulated signal. That is, the intensity fluctuations of the portions of sensor array 204 that are associated with the interior of boundary 602 can be used as the demodulated signal to compare to the reference signal (block 506 of FIG. 5). In this case, process 500 may continue. Process 700 may also include discerning the received signal not associated with the object and/or human and not using those portions of the received signal as the demodulated signal. In this case, the calculation of the distance to object 102 is not based on a phase difference between the reference signal and portions of the received signal not associated with the object.

The terms "comprises" and "comprising" specify the presence of stated features, integers, steps or components but does not preclude the presence or addition of one or more other features, integers, steps, components or groups thereof. The word "exemplary" is used to mean "serving as an example, instance, or illustration" of more than one example. Any embodiment described herein as "exemplary" does not necessarily imply it to be preferred or advantageous over other embodiments.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

The invention claimed is:
1. A method comprising:
  modulating a property of laser light with a reference signal to generate a transmit signal;
  diverging the transmit signal to illuminate a scene corresponding to a field of illumination with the transmit signal, wherein the scene and the field of illumination include an object;
  receiving, at a sensor, a reflected signal formed by the transmit signal reflecting off the object;
  comparing a phase of the received signal to a phase the reference signal;
  calculating a distance to the object based on the comparing; and
  capturing, in a camera, the reflected signal to form an image for viewing by an operator of a field of view, wherein the field of view is illuminated by the transmit signal, corresponds to the scene, and includes the object, and wherein modulating the property of the laser light includes reducing the amplitude of modulation and increasing the frequency of modulation of the laser light to reduce speckling of the image captured by the camera.

2. The method of claim 1, wherein comparing the phase includes:

measuring a phase difference between the received signal and the reference signal, and calculating the distance to the object based on the phase difference.

3. The method of claim 2, further comprising:

lowering an average intensity of the transmit signal when the calculated distance is below a threshold.

4. The method of claim 2, wherein modulating the property of the laser light includes modulating an intensity of the laser.

5. The method of claim 2, wherein receiving at the sensor further comprises:

capturing, in a camera, an image including a field of view illuminated by the transmit signal; detecting boundaries of the object in the image; and discerning portions of the received signal associated with the object based on the detected boundaries, wherein measuring the phase difference includes measuring a phase difference between the portions of the received signal associated with the object and the reference signal, and wherein calculating the distance includes calculating the distance to the object based on the phase difference between the portions of the received signal associated with the object and the reference signal.

6. The method of claim 5, further comprising:

determining that the object is a human; and lowering an intensity of the laser when the calculated distance is below a first threshold and when determined that the object is the human.

7. The method of claim 6, wherein detecting boundaries of the object includes detecting boundaries of a face of the human.

8. The method of claim 5, wherein receiving at the sensor further comprising:

capturing, in a camera, an image of the field of view, including the object, illuminated by the transmit signal, wherein the calculated distance is used as a reference point for an autofocus algorithm.

9. The method of claim 8, wherein the autofocus algorithm is contrast based and the calculated distance is used to set a lower and upper bound for the autofocus algorithm.

10. The method of claim 9, wherein a difference between the lower and upper bound is based on a signal strength of the received signal such that a low signal strength results in a larger difference than a high signal strength.

11. A device comprising:

a laser to emit laser light;

a driver to modulate a property of the laser light with a reference signal to generate a transmit signal;

a lens to diverge the transmit signal to illuminate a scene corresponding to a field of illumination with the transmit signal, wherein the scene and the field of illumination include an object;

a sensor to receive a reflected signal formed by the transmit signal reflecting off the object;

a mixer to compare a phase of the received signal to a phase the reference signal;

a processor to calculate a distance to the object based on the comparison; and a camera to capture an image of the scene corresponding to a field of view illuminated by the transmit signal, wherein the field of view is illuminated by the transmit signal, corresponds to the scene, and includes the object, and wherein the driver modulates the property of the laser light by reducing the amplitude of modulation and increasing the frequency of modulation of the laser light to reduce speckling of the image captured by the sensor.

12. The device of claim 11, wherein the mixer is configured to measure a phase difference between the received signal and the reference signal, and the processor is configured to calculate the distance to the object based on the phase difference.

13. The device of claim 12, wherein the driver is configured to lower an average intensity of the transmit signal when the calculated distance is below a threshold.

14. The device of claim 12, wherein the driver is configured to modulate an intensity of the laser light.

15. The device of claim 12, further comprising:

a camera to capture an image including a field of view illuminated by the transmit signal, wherein the processor is configured to detect boundaries of the object in the image and discerning portions of the received signal associated with the object based on the detected boundaries, wherein the mixer is configured to measure a phase difference between the portions of the received signal associated with the object and the reference signal, and wherein the processor is configured to calculate the distance to the object based on the phase difference between the portions of the received signal associated with the object and the reference signal.

16. The device of claim 15, wherein the processor determines that the object is a human; and wherein the driver lowers an intensity of the laser when the calculated distance is below a first threshold and when the processor determines that the object is the human.

17. The device of claim 16, wherein the processor detects boundaries of a face of the human.

18. The device of claim 15, wherein the camera is configured to capture an image of the field of view, including the object, illuminated by the transmit signal, wherein the calculated distance is used as a reference point for an autofocus algorithm.

19. The device of claim 18, wherein the autofocus algorithm is contrast based and the calculated distance is used to set a lower and upper bound for the autofocus algorithm.

20. The method of claim 19, wherein a difference between the lower and upper bound is based on a signal strength of the received signal such that a low signal strength results in a larger difference than a high signal strength.

* * * * *